Sept. 1, 1931.   R. W. BOWNE   1,821,877

LOCKING DEVICE FOR ANTIFRICTION BEARING RINGS

Filed May 28, 1930

INVENTOR
Raymond W. Bowne
BY
Pennie, Davis, Marvin & Edmonds
HIS ATTORNEYS

Patented Sept. 1, 1931

1,821,877

UNITED STATES PATENT OFFICE

RAYMOND WILLIAM BOWNE, OF LEBANON, NEW HAMPSHIRE, ASSIGNOR TO SPLIT BALLBEARING CORPORATION, OF LEBANON, NEW HAMPSHIRE, A CORPORATION OF NEW HAMPSHIRE

LOCKING DEVICE FOR ANTIFRICTION BEARING RINGS

Application filed May 28, 1930. Serial No. 456,493.

This invention relates to bearings and more particularly concerns locking means for securing the inner race or bearing surface of a bearing structure to a shaft.

Bearing structures for rotatively supporting line shafting and various other rotary elements usually include an inner bearing race which is non-rotatively secured to the shaft and which rotatively engages and is supported by suitable bearing means, such as an outer journal or, in the case of anti-friction bearings, a series of anti-friction members borne in an outer bearing race. In the past, considerable difficulty has been encountered in fixing the inner bearing race to the shaft. It has been heretofore proposed to form the inner race in two halves or parts, and to clamp these parts about the shaft by bolts or equivalent means whereby the race is fixed to the shaft, but this procedure is unsatisfactory for several reasons. Since the material employed in forming bearing races is ordinarily tempered steel, the parts of the race cannot be deformed to any appreciable extent by the clamping means, and accordingly, a given size of race can be clamped to one size of shaft only. Since shaft diameters vary slightly due to inaccuracies in machining and to wear, a separate inner bearing race must be constructed for each application if a tight fit between the race and the shaft is to be obtained. Further, when once clamped on the shaft, the split bearing race cannot be subsequently tightened to compensate for shaft wear. The material used to form the races of anti-friction bearings is very high grade expensive steel and the provision of large extensions of this material on the bearing race to permit the use of powerful clamping means materially increases the cost of the bearing structure. If smooth operation and durability are to be obtained, the separable parts of a split bearing race must present an unbroken surface for engagement with the anti-friction members and further, must be accurately circular, and if the halves of the race are deformed or are spaced apart because of under or over size shafts, satisfactory operation of the bearing cannot be obtained.

With the above and other considerations in mind, it is proposed in accordance with the present invention to provide improved means for non-rotatively clamping and locking the inner race of an anti-friction bearing structure to a shaft. My improved locking means is adapted to secure a bearing race to shafts having appreciably smaller diameters than the internal diameter of the race, and in this manner, acts as an adapter to permit the use of a given size of bearing race on a plurality of shafts of varying sizes. The race locking means of the invention are so designed that relative rotation between the bearing race and the shaft serves to increase the locking effect, and in this manner, the connection between the race and the shaft is maintained tight while the shaft is in rotation. The locking means not only prevents relative rotation between the bearing race and the shaft, but further supports the race in a position concentric with the shaft and so maintains the bearing surfaces of the race in concentric alignment with the shaft axis.

Various other specific objects, advantages and characteristic features of the invention will be pointed out or will become apparent as the description thereof progresses.

In general, the objects of my invention are carried out by providing a locking ring or member which may be rigidly and non-rotatively fixed to the shaft to which the bearing race is to be secured, and by further providing a plurality of similar inter-engageable eccentric cam surfaces on both the locking ring and the bearing race, such surfaces being symmetrically disposed with respect to the axes of the race and the ring. The inter-engageable cam surfaces on the bearing race and the locking ring extend axially along these members and are arranged to be disposed in over-lapping or telescopic relationship and when so disposed, if the race is turned relative to the locking ring, the cam surfaces on these members lock into firm engagement and the race is fixed to the locking ring in a position concentric to the shaft. In one modification of the invention, the cam surfaces on the bearing race and the locking ring are conical or tapered in order that an axial as well as an annular locking engagement between the race and the locking ring may be produced. In a preferred embodiment of the invention, it is preferred to provide three or more eccentric cam surfaces on both the bearing race and the locking ring, whereby the bearing race may be firmly supported in concentric relation to the shaft when the cam surfaces on the race and the ring are brought into locking engagement.

The invention will be best understood by reference to the accompanying drawings, in which certain embodiments of the invention are illustrated. In the drawings, Figure 1 is a sectional side view of a bearing structure embodying my invention and mounted on a shaft;

Figure 1:
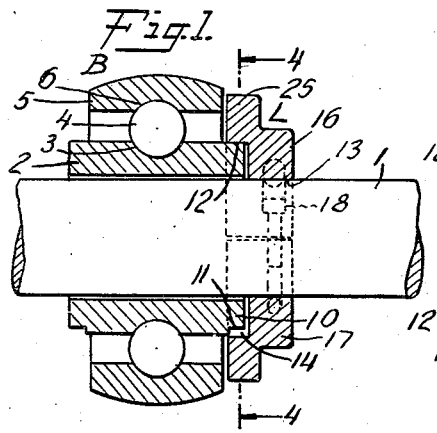

Referring to the drawings, and more particularly to Figs. 1 through 4, I have shown a shaft 1 rotatably carried by an anti-friction bearing generally indicated at B. The bearing shown comprises an inner bearing race 2 having a groove 3 therein for the reception of suitable anti-friction members such as the balls 4, and an outer race 5 having an internal groove 6 therein for the reception of the bearing balls as shown. The outer race 5 may be non-rotatively fixed to and supported by any suitable means. The inner and outer bearing races 2 and 5 may be formed in one piece or may comprise split races, and these elements are preferably formed of highly tempered steel or other suitable hard metallic alloy. As shown, the inner race 2 may comprise two halves split along the line 7 and secured together about the shaft by suitable means such as the screws 8. The split feature is employed solely for the purpose of permitting the assembly of the bearing structure about a long shaft in installations where it is difficult to pass one piece bearing parts over the end of the shaft. If desired, broken split bearing races of the type shown in Patent No. 1,498,748 to Winslow S. Pierce, Jr., may be employed.

Figure 2:
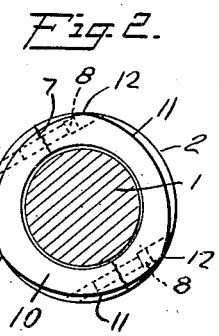
Fig. 2 is an end view of the inner bearing race shown in Fig. 1.

Referring now more particularly to the locking means of the present invention, an extension 10 is formed on one end of the inner bearing race 2. The surface of this extension comprises a plurality of eccentric cam surfaces 11 which are preferably of equal circumferential extent and are symmetrically disposed with the axis of the race, as shown in Fig. 2. Since the cam surfaces 11 are equal and symmetrical, the high points 12 formed at the points of juncture of the cam surfaces are concentric and are equally spaced circumferentially about the bearing race. In a preferred embodiment of the invention, three or more cam surfaces 11 and high points 12 are provided, although the number thereof may obviously be varied without departing from the scope of the invention. When a split bearing race is employed, the line of division 7 between the two halves thereof is preferably arranged so that it does not pass through any of the high points 12, and this line of division may be disposed substantially as shown in Fig. 2.

Figure 3:
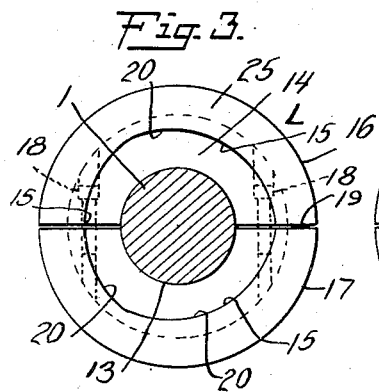
Fig. 3 is an end view of the locking ring shown in Fig. 1.

The locking member or ring is indicated at L and is best shown in Figs. 1 and 3. This ring is provided with a central shaft opening 13 and with a flange portion 25 forming a recess 14 in one end face thereof. The inner surface of the recess 14 comprises a plurality of eccentric cam surfaces 20 symmetrically disposed with respect to the axis of the ring as shown in Fig. 3. The cam surfaces 20 form, at their mid points, a plurality of low poins or points of minimum radius 15, which points are preferably of equal radius and are preferably equally spaced circumferentially about the locking ring as shown. The number of points 15 of minimum radius employed may be varied as desired but should be equal to the number of high points 12 on the extension 10 of the bearing race 2. It is preferred that the cam surfaces 11 on the bearing race 2 and the cam surfaces 20 on the locking ring L be arcuate and concentric with respect to each other, and eccentric with respect to the axes of the race and ring, but the invention, in its broader aspects, is not limited to this particular form or arrangement of cam surfaces. The dimensions of the recess 14 in the locking ring L are such that the bearing race extension 10 may be inserted within this recess when the race and the ring are in such relative angular relation that the high points 12 on the race are midway between adjacent points of minimum radius 15 on the ring. The radius of the high points 12 on the bearing race extension 10 is appreciably greater than the radius of the low points 15 on the locking ring L, in order that a locking engagement may be obtained between these elements as hereinafter described.

Suitable means are provided for securely locking the ring L to the shaft 1. In the disclosed embodiment, the ring L is formed in two parts 16 and 17 and suitable means such as the screws 18 are provided to clamp these parts together and into engagement with the shaft. The locking ring is preferably formed of a slightly deformable metal such as cast or wrought iron and this member is preferably so formed that the smallest diameter of a shaft with which the bearing is to be used may be securely clamped between the two halves of the locking ring before these halves are brought into full contact with each other along the line of division 19 therebetween.

Figure 4:
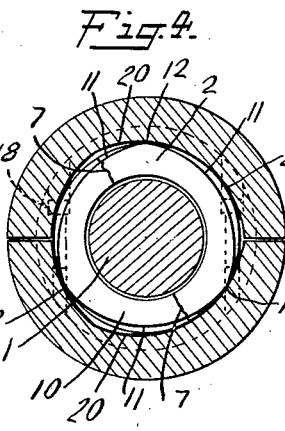
Fig. 4 is a sectional view taken along the line 4—4 of Fig. 1 and viewed in the direction of the arrows.

In order to lock the inner bearing race 2 to the shaft 1, the locking ring L is first assembled about the shaft and tightly clamped in non-rotative engagement by means of the screws 18. The bearing race 2 is then assembled about the shaft and its two halves are secured together by the screws 8 or by other suitable means. The bearing race 2 is preferably designed to have a bore of slightly larger diameter than the diameter of the largest shaft to which it is applied, and accordingly the race may be moved on the shaft. The race 2 is now moved axially along the shaft and its extension 10 is inserted in the recess 14 within the flange 25 of the locking ring L, the race being turned on the shaft, if necessary, to bring the high points 12 on the extension 10 into registry with the points of maximum radius of the cam surfaces 20 on the locking ring. The bearing race 2 is then given a slight turn about the shaft in the opposite direction to that in which the shaft is to rotate and in this manner, the cam surfaces 11 on the race extension 10 are brought into clamping engagement with the cam surfaces 20 in the recess 14 of the locking ring L, the relation of the interengaging surfaces being clearly shown in Fig. 4. As shown in Fig. 4, a wedging three-point support is established between the cam surfaces of the bearing race and of the locking ring, and in this manner, the bearing race is rigidly and permanently secured to the ring in a position concentric to the shaft. The assembly of the bearing structure is then completed, the outer bearing race 5 being fixed to a suitable support, and the subsequent rotation of the shaft 1 tends to turn the race 2 in a direction opposite to that in which the shaft rotates, whereby the locking engagement between the cam surfaces on the race and the locking ring is tightened when the shaft is in operation.

The wedging engagement of the high points 12 on the bearing race 2 with the overlying cam surfaces 20 within the flange 25 of the locking ring L, tends to separate the two halves of the locking ring at the end thereof which cooperates with the bearing race. Accordingly, there is a tendency for the two halves of the locking ring L to move relative to each other about the plane of the connecting screws 18 as a fulcrum, whereby the outer ends of these halves are pressed into even firmer gripping engagement with the shaft 1 than that produced with the screws 18 alone. In this manner, the rotation of the shaft 1, which tends to turn the bearing race 2 thereon, not only strengthens the clamping engagement between the race and the locking ring, but strengthens the gripping engagement between the locking ring and the shaft as well.

As stated above, three or more inter-engaging points are preferably provided on the bearing race and the locking ring, and due to this arrangement, the race 2 is carried solely by the locking ring and in a position concentric to the shaft 1. In this manner, the shaft is disposed concentrically with respect to the bearing surfaces which carry it, and does not move through an eccentric path as it rotates. The entire load of the shaft is borne by the locking ring L and none of the load is transmitted directly from the race to the shaft. This prevents the cutting or wearing of the shaft by the race, which, as stated above, is formed of extremely hard metal. It has been found that if three inter-engaging points are provided on the bearing race and the locking ring, a three-point support is provided, and engagement between all of the points is ensured even though these points may not be exactly equally spaced circumferentially about the members. This is also true when two points of engagement are used, but with a two-point support, the race will tend to rock relatively to the shaft and will consequently strike the shaft as the shaft rotates. Satisfactory operation can be obtained with four or more points of engagement between the cam surfaces on the race and the locking ring, and in this case, if the high points on one of the members are not equally spaced circumferentially about the axis thereof, a three-point support will result. Two points of engagement may be used between the cam surfaces on the bearing race and the locking ring if the race fits the shaft rather closely or if the shaft load is such that rocking of the race is not produced during rotation. The invention, in its broader aspects, includes two or more points of locking engagement between the race and the locking ring, although in the preferred embodiment thereof, three points of engagement are used.

Figure 6:
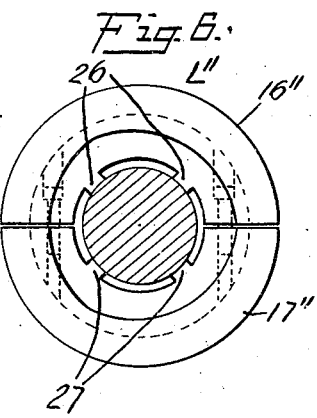
Figs. 5 and 6 are respectively end views of two modified forms of locking members embodying my invention.
Figure 5:
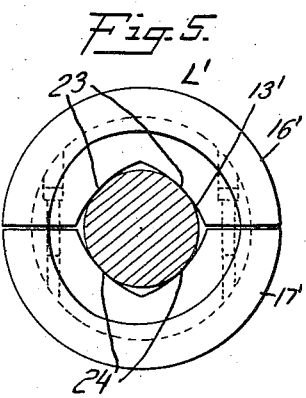

Various means may be employed in securing a tight non-rotative engagement between the locking ring L and the shaft 1. Thus, as shown in Fig. 5, the shaft engaging portion 13' of the locking ring L' may be non-circular in form and arranged to present two shaft engaging portions 23 and 24 on each of the halves 16' and 17' of the ring. This effect may also be produced by forming two spaced shaft engaging blocks 26 and 27 on each of the halves 16'' and 17'' of the locking ring L″, as shown in Fig. 6. If desired, the shaft engaging faces of the blocks 26 and 27 may be left in a rough and unfinished state to increase the friction between these parts and the shaft 1. The forms of shaft engaging means shown in Figs. 5 and 6 provide a vise-like four-point engagement between the locking ring and the shaft and so ensures a rigid and fixed engagement between these elements.

Figure 7:
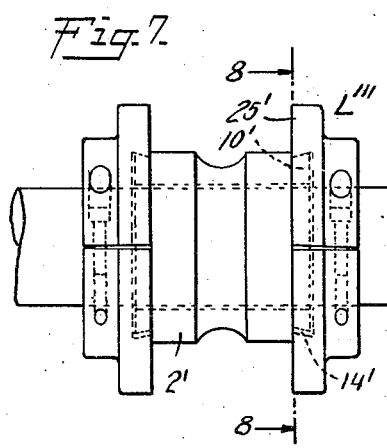
Fig. 7 is a side view of a modified arrangement of the locking means of the invention.

Under certain conditions and particularly when the bearing race is of considerable axial length, locking rings may be employed at both ends thereof as indicated in Fig. 7. When this arrangement is used, the bearing race is first assembled about the shaft and the two locking rings are then loosely assembled about the shaft and moved into such positions that their flanges 25′ over-lie and surround the extensions 10′ on the two end faces of the bearing race 2′. The two locking rings are then aligned in such a manner that the points of minimum radius on their cam surfaces are in exact axial alignment, whereupon the rings are rigidly clamped to the shaft. The subsequent rotation of the bearing race 2′ relative to the shaft and the locking rings forces the high points of the cam surfaces on the extensions 10′ thereof into locking engagement with the cam surfaces within the recesses 14′ of the two locking rings.

Figure 8:
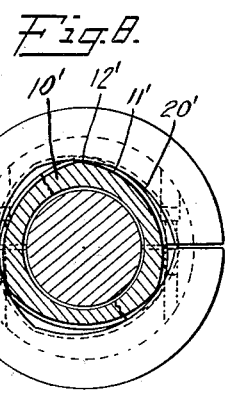
Fig. 8 is a sectional view taken along the line 8—8 of Fig. 7.
Figure 9:
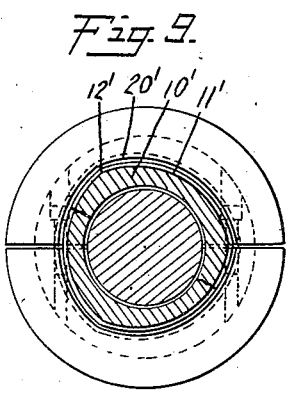
Fig. 9 is a sectional view similar to Fig. 8 but showing the bearing race and the locking ring in unlocked and separable relation.

In a modified form of the invention, the inter-engaging cam surfaces on the bearing race and the locking ring may be tapered or conical whereby an axial as well as an annular locking effect is attained between the race and the locking ring. Thus, as shown in Figs. 7, 8 and 9, the cam surfaces of the extension 10′ on the bearing race 2′ may be flared outwardly and the cam surfaces of the recess 14′ in the locking ring L‴ may be flared inwardly whereby the race is drawn into tight end-wise engagement with the locking ring when turned into locking engagement therewith. The maximum dimensions of the extension 10′ on the race at the outer end thereof are preferably smaller than the minimum dimensions of the recess 14′ in the ring at the inner end thereof so that the extension 10′ may be inserted within the recess 14′ when the parts are in such relative position that the points of maximum radius of their cam surfaces are in alignment, as shown in Fig. 9. When the bearing race 2′ is turned with respect to the locking ring L‴, the high points 12′ on the cam surfaces 11′ of the race extension 10′ are brought into locking engagement with the cam surfaces 20′ on the locking ring, as shown in Fig. 8.

Although the invention has been described in connection with a limited number of specific embodiments, it should be understood that the scope of the invention is not limited to the constructions and arrangements shown, but includes all such modifications thereof as fall within the scope of the appended claims. Thus, the bearing race and the locking ring may be formed in one piece rather than in separable parts, the locking ring may be fixed to the shaft by one or more set screws or equivalent means, internal cam surfaces may be provided on the bearing race to over-lap and surround external cam surfaces on the locking ring, and various other modifications may be made without departing from the scope of the invention.

I claim:

1. In a device of the character described, in combination with a shaft and a bearing race surrounding said shaft, a locking ring, means for clamping said locking ring to said shaft, and a plurality of axially extending inter-engageable cam surfaces on said race and said ring for locking said race to said ring.

2. In a device of the character described, in combination with a shaft, two annular members surrounding said shaft and comprising a bearing race and a locking ring, means for fixing said locking ring to said shaft and means for locking said bearing race to said locking ring comprising a plurality of external eccentric cam surfaces on one of said members and a plurality of internal eccentric cam surfaces on the other of said members surrounding and respectively engageable with said first mentioned cam surfaces.

3. In a device of the character described, in combination with a shaft, two annular members surrounding said shaft and comprising a bearing race and a locking ring, means for fixing said locking ring to said shaft and means for locking said bearing race to said locking ring comprising a plurality of external eccentric cam surfaces equally spaced circumferentially on one of said members and an equal number of similarly spaced eccentric cam surfaces on the other of said members disposed to over-lie and engage said first mentioned cam surfaces.

4. In a device of the character described, in combination with a shaft, two annular members surrounding said shaft and comprising a bearing race and a locking ring, means for fixing said locking ring to said shaft and means for locking said bearing race to said locking ring comprising a plurality of external eccentric cam surfaces equally spaced circumferentially on one of said members, said cam surfaces being symmetrically disposed about the axis of said member, and an equal number of equally spaced and similarly disposed internal eccentric cam surfaces on the other of said members and surrounding and respectively engageable with said first mentioned cam surfaces.

5. In a device of the character described, in combination with a shaft, two annular members surrounding said shaft and comprising a bearing race and a locking ring, means for fixing said locking ring to said shaft and means for locking said bearing race to said locking ring comprising at least three external eccentric cam surfaces on one of said members and an equal number of internal eccentric cam surfaces on the other of said members surrounding and respectively engageable with said first mentioned cam surfaces.

6. In a device of the character described, in combination with a shaft, two annular members surrounding said shaft and comprising a bearing race and a locking ring, means for fixing said locking ring to said shaft and means for locking said bearing race to said locking ring comprising at least three external eccentric cam surfaces equally spaced circumferentially on one of said members and an equal number of internal eccentric cam surfaces equally spaced circumferentially on the other of said members and disposed to over-lie and engage said first mentioned cam surfaces.

7. In a device of the character described, in combination with a shaft, two annular members surrounding said shaft and comprising a bearing race and a locking ring, means for fixing said locking ring to said shaft and means for locking said bearing race to said locking ring comprising at least three external eccentric cam surfaces equally spaced circumferentially on one of said members, said cam surfaces being symmetrically disposed with respect to the axis of said member, and an equal number of equally circumferentially spaced and similarly disposed internal eccentric cam surfaces on the other of said members surrounding and respectively engageable with said first mentioned cam surfaces.

8. In a device of the character described, in combination with a shaft and a bearing race surrounding said shaft, a locking ring surrounding said shaft adjacent said bearing race and having a flange over-lying a part of said bearing race, means for clamping said locking ring to said shaft and means for locking said bearing race to said locking ring in a position concentric to said shaft comprising a plurality of circumferentially spaced external eccentric cam surfaces on said part of said bearing race and an equal number of equally spaced internal cam surfaces on the flange of said ring, the longest radii of said external cam surfaces being greater than the shortest radii of said internal cam surfaces whereby a locking engagement may be established between said bearing race and said locking ring at a plurality of circumferentially spaced points.

9. In a device of the character described, in combination with a shaft and a bearing race surrounding said shaft, a locking ring surrounding said shaft adjacent said bearing race and having a portion over-lying a part of said bearing race, means for clamping said locking ring to said shaft and means for locking said bearing race to said locking ring in a position concentric to said shaft comprising a plurality of external eccentric cam surfaces on said part of said bearing race, said surfaces being equally spaced circumferentially about said race, and an equal number of equally spaced similar internal cam surfaces on said overlying portion of said ring and respectively engageable with said cam surfaces on said part of said race, whereby a locking engagement may be established between said race and said ring at a plurality of circumferentially spaced points thereon.

10. In a device of the character described, in combination with a shaft and a bearing race surrounding said shaft, a locking ring surrounding said shaft adjacent said bearing race and having a portion thereof over-lying a part of said bearing race, means for clamping said locking ring to said shaft and means for locking said bearing race to said locking ring in a position concentric to said shaft comprising a plurality of equally circumferentially spaced external eccentric cam surfaces on said part of said bearing race, said surfaces being symmetrically disposed about the axis of said race, an equal number of equally circumferentially spaced and similarly symmetrically disposed internal eccentric cam surfaces on said overlying portion of said ring, the longest radius of said extended cam surfaces being greater than the shortest radius of said internal cam surfaces whereby a locking engagement may be established between the cam surfaces on said race and on said ring.

11. In a device of the character described, in combination with a shaft and a bearing race surrounding said shaft, a locking ring surrounding said shaft adjacent said bearing race and having a flange over-lying a part of said bearing race, means for clamping said locking ring to said shaft and means for locking said bearing race to said locking ring in a position concentric to said shaft comprising at least three circumferentially spaced external eccentric cam surfaces on said part of said bearing race and an equal number of equally spaced similar internal cam surfaces on the flange of said ring, the longest radii of said external cam surfaces being greater than the shortest radii of said internal cam surfaces, whereby engagement may be established between said race and said ring at a plurality of circumferentially spaced points thereon.

12. In a device of the character described, in combination with a shaft and a bearing race surrounding said shaft, a locking ring surrounding said shaft adjacent said bearing race and having a flange over-lying a part of said bearing race, means for clamping said locking ring to said shaft and means for locking said bearing race to said locking ring in a position concentric to said shaft comprising at least three equally circumferentially spaced external eccentric cam surfaces on said part of said bearing race and an equal number of equally spaced internal eccentric cam surfaces on the flange of said ring respectively engageable with said first mentioned cam surfaces.

13. In a device of the character described, in combination with a shaft and a bearing race surrounding said shaft, a locking ring surrounding said shaft adjacent said bearing race and having a flange over-lying a part of said bearing race, means for clamping said locking ring to said shaft and means for locking said bearing race to said locking ring in a position concentric to said shaft comprising at least three equally circumferentially spaced external eccentric cam surfaces on said part of said bearing race, said surfaces being symmetrically disposed about the axis of said race, and an equal number of equally circumferentially spaced and similarly symmetrically disposed internal eccentric cam surfaces on the flange of said ring, the longest radius of said external cam surfaces being greater than the shortest radius of said internal cam surfaces whereby a locking engagement may be established between said bearing race and said locking ring at a plurality of circumferentially spaced points thereon.

14. In a device of the character described, in combination with a shaft and a bearing race surrounding said shaft, a locking ring comprising two semi-annular sections, connecting means for securing the sections of said locking ring together around and in clamping relation to said shaft adjacent said bearing race, a flange on said locking ring axially spaced from said connecting means and over-lying a part of said bearing race and means for locking said bearing race to said locking ring comprising a plurality of external circumferentially spaced eccentric cam surfaces on said part of said bearing race and a plurality of circumferentially spaced internal cam surfaces on the flange of said locking ring engageable with said external cam surfaces on said bearing race, the sections of said locking ring having shaft engaging portions on the opposite side of said connecting means from said flange, whereby the expanding pressure exerted between the sections of said locking ring by the cam surfaces on said bearing race causes a gripping pressure to be exerted on the shaft by said shaft engaging portions of said locking ring.

15. In a device of the character described, in combination with a shaft, two annular members surrounding said shaft and comprising a bearing race and a locking ring, means for fixing said locking ring to said shaft and means for locking said bearing race to said locking ring comprising a plurality of external tapered eccentric cam surfaces on one of said members and a plurality of internal tapered eccentric cam surfaces on the other of said members surrounding and respectively engageable with said external cam surfaces.

16. In a device of the character described, in combination with a shaft and a bearing race surrounding said shaft, a locking ring surrounding said shaft adjacent said bearing race and having a flange over-lying a part of said bearing race, means for clamping said locking ring to said shaft and means for producing both radial and axial locking engagement between said bearing race and said locking ring comprising a plurality of tapered external eccentric cam surfaces on said part of said bearing race, a plurality of similarly tapered internal eccentric cam surfaces on the flange of said locking ring engageable with said external cam surfaces and means for limiting the axial movement of said bearing race relative to said locking ring due to the taper of said cam surfaces.

17. In a device of the character described, in combination with a shaft and a bearing race surrounding said shaft, a locking ring surrounding said shaft adjacent said bearing race and having a flange over-lying a part of said bearing race, means for clamping said locking ring to said shaft and means for producing both radial and axial locking engagement between said bearing race and said locking ring comprising at least three tapered external cam surfaces on said part of said bearing race, an equal number of similarly tapered internal eccentric cam surfaces on the flange of said locking ring respectively engageable with said external cam surfaces and an abutment on said bearing race for engagement with said locking ring to limit the relative axial movement between said bearing race and said locking ring due to the taper of said cam surfaces.

In testimony whereof I affix my signature.

RAYMOND WILLIAM BOWNE.

CERTIFICATE OF CORRECTION.

Patent No. 1,821,877.             Granted September 1, 1931, to

RAYMOND WILLIAM BOWNE.

It is hereby certified that error appears in the printed specification of the above numbered patent requiring correction as follows: Page 2, line 98, for the word "poins" read points; page 5, line 102, claim 10, for "extended" read external; and that the said Letters Patent should be read with these corrections therein that the same may conform to the record of the case in the Patent Office.

Signed and sealed this 6th day of October, A. D. 1931.

(Seal)

M. J. Moore,
Acting Commissioner of Patents.